(12) United States Patent
Limburn et al.

(10) Patent No.: US 10,732,936 B2
(45) Date of Patent: *Aug. 4, 2020

(54) MODULARIZING STEPS WITHIN A UML USER MODEL INTERACTION PATTERN

(71) Applicant: INTERNATIONAL BUSINESS MACHINES CORPORATION, Armonk, NY (US)

(72) Inventors: Jonathan Limburn, Winchester (GB); Dan Jeffrey Mandelstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 832 days.

This patent is subject to a terminal disclaimer.

(21) Appl. No.: 14/678,077

(22) Filed: Apr. 3, 2015

(65) Prior Publication Data

US 2015/0212801 A1    Jul. 30, 2015

Related U.S. Application Data

(63) Continuation of application No. 12/826,873, filed on Jun. 30, 2010, now Pat. No. 9,069,559.

(51) Int. Cl.
*G06F 9/44* (2018.01)
*G06F 8/35* (2018.01)
*G06F 8/34* (2018.01)
*G06F 8/75* (2018.01)

(52) U.S. Cl.
CPC ............... *G06F 8/35* (2013.01); *G06F 8/34* (2013.01); *G06F 8/75* (2013.01)

(58) Field of Classification Search
CPC ................. G06F 8/34; G06F 8/35; G06F 8/75
See application file for complete search history.

(56) References Cited

U.S. PATENT DOCUMENTS 6,199,195 B1    3/2001   Goodwin et al.
6,208,345 B1    3/2001   Sheard et al.
(Continued)

OTHER PUBLICATIONS

Paulo Pinheiro da Silva, Object Modelling of Interactive Systems the UMLi Approach, 2002 (Year: 2002).*

(Continued)

*Primary Examiner* — Lewis A Bullock, Jr.
*Assistant Examiner* — Tina Huynh
(74) *Attorney, Agent, or Firm* — Susan Murray; Edell, Shapiro & Finnan, LLC

(57) ABSTRACT

User modeling facilitates use of a UML user model to define roles, goals, and tasks inside an organization, and defines how the roles, goals, and tasks relate to business entities within the organization. This information can be used to generate a user interface (UI) that facilitates management of the defined business entities within the organization. Each task defined inside the model, which may be represented as a stereotyped class in the UML class diagram, has a number of explicit steps associated with the task. These steps are outlined in UML activity diagrams and defined in a task interaction pattern. A modular approach to constructing UML activity diagram using the task interacting pattern to reduce the size of the model permits greater flexibility in generating the UI.

21 Claims, 8 Drawing Sheets

(56) References Cited

U.S. PATENT DOCUMENTS

| | | | |
|---|---|---|---|
| 6,550,054 B1* | 4/2003 | Stefaniak | G06F 8/74 717/104 |
| 6,973,638 B1 | 12/2005 | Gangopadhyay et al. | |
| 7,188,332 B2 | 3/2007 | Charisius et al. | |
| 7,685,576 B2 | 3/2010 | Hartmann et al. | |
| 7,818,714 B2 | 10/2010 | Ryan et al. | |
| 7,873,422 B2 | 1/2011 | Dumas et al. | |
| 8,015,541 B1* | 9/2011 | Srinivasan | G06F 8/20 717/104 |
| 8,103,914 B2 | 1/2012 | Kikuchi | |
| 8,291,372 B2 | 10/2012 | Dangeville et al. | |
| 2002/0010741 A1 | 1/2002 | Stewart et al. | |
| 2002/0010909 A1 | 1/2002 | Charisius et al. | |
| 2002/0016954 A1 | 2/2002 | Charisius et al. | |
| 2002/0023257 A1* | 2/2002 | Charisius | G06F 8/20 717/106 |
| 2002/0032900 A1 | 3/2002 | Charisius et al. | |
| 2002/0046394 A1* | 4/2002 | Do | G06F 8/20 717/108 |
| 2002/0108101 A1 | 8/2002 | Charisius et al. | |
| 2003/0212984 A1 | 11/2003 | Miyazaki et al. | |
| 2004/0034846 A1 | 2/2004 | Ortal et al. | |
| 2004/0153992 A1 | 8/2004 | Molina-Moreno et al. | |
| 2004/0205726 A1 | 10/2004 | Chedgey et al. | |
| 2005/0010899 A1 | 1/2005 | Kung et al. | |
| 2005/0155016 A1 | 7/2005 | Bender | |
| 2005/0234708 A1 | 10/2005 | Meehan et al. | |
| 2005/0256665 A1* | 11/2005 | Hartmann | G06F 11/3688 702/121 |
| 2006/0004872 A1* | 1/2006 | Tian | G06Q 10/08 |
| 2006/0174222 A1* | 8/2006 | Thonse | G06F 8/10 717/106 |
| 2006/0259289 A1 | 11/2006 | Shia | |
| 2007/0038492 A1 | 2/2007 | Ryan et al. | |
| 2007/0061776 A1* | 3/2007 | Ryan | G06F 8/10 717/105 |
| 2007/0168929 A1* | 7/2007 | Larvet | G06F 8/10 717/104 |
| 2007/0198968 A1* | 8/2007 | Shenfield | G06F 8/10 717/104 |
| 2007/0240103 A1 | 10/2007 | Beaton et al. | |
| 2007/0288412 A1 | 12/2007 | Linehan | |
| 2008/0109475 A1 | 5/2008 | Burmester et al. | |
| 2008/0120581 A1 | 5/2008 | Oishi et al. | |
| 2008/0301626 A1 | 12/2008 | Sivaram | |
| 2009/0094575 A1* | 4/2009 | Vieira | G06F 8/10 717/104 |
| 2009/0113381 A1* | 4/2009 | Chancey | G06F 8/10 717/104 |
| 2009/0235229 A1 | 9/2009 | Dangeville et al. | |
| 2009/0241088 A1* | 9/2009 | Dangeville | G06F 8/10 717/105 |
| 2010/0023922 A1* | 1/2010 | Limburn | G06F 8/10 717/104 |
| 2010/0180256 A1 | 7/2010 | Gorthi et al. | |
| 2011/0088010 A1* | 4/2011 | Dangeville | G06F 8/10 717/104 |
| 2011/0225160 A1 | 9/2011 | Sonoda | |
| 2012/0260230 A1* | 10/2012 | Choudhary | G06F 11/3616 717/105 |

OTHER PUBLICATIONS

Liliana Favre, UML and the Unified Process, 2003 (Year: 2003).*

Dangeville et al., FR920090009, 45 pages (Year: 2019).*

IBM, "Extending the User Modelling tools to allow for modelling sub tasks", IP.com Prior Art Database Technical Disclosure No. IPCOM000184037D, Jun. 9, 2009, pp. 1-3, IP.com.

Debasish Kundu et al., "A Novel Approach to Generate Test Cases from UML Activity Diagrams", Indian Institute of Technology, 2009, <http://www.jot.fm/issues/issue_2009_05/article1.pdf>, pp. 1-19.

Sungwon Kang et al., "Transformation Rules for Synthesis of UML Activity Diagram from Scenario-based Specification", IEEE, 2010, <http://ieeexplore.ieee.org/stamp/stamp.jsp?tp=&arnumber=5676292>, pp. 1-6.

Lusi Barbosa et al., "Formal Aspects of Component Software", Springer, 2012, <http://download.springer.com/static/pdf/896/bok%253A978-3-642-27269-1.pdf?auth66=1424467899_b34c8c905496193eaca3d3f2b0050da9&ext=.pdf. pp. 1-314.

* cited by examiner

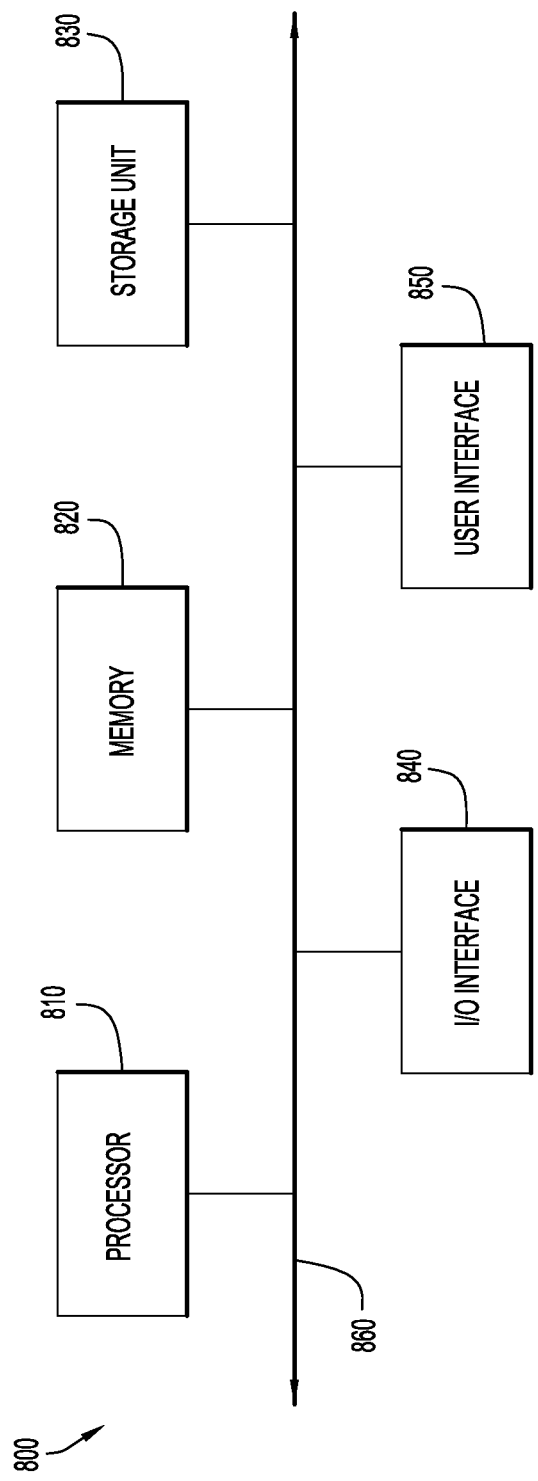

MODULARIZING STEPS WITHIN A UML USER MODEL INTERACTION PATTERN

CROSS-REFERENCE TO THE RELATED APPLICATIONS

This application is a continuation of U.S. patent application Ser. No. 12/826,873, filed on Jun. 30, 2010 in the U.S. Patent and Trademark Office, now U.S. Pat. No. 9,069,559, the disclosures of which are incorporated herein by reference in their entireties.

BACKGROUND

1. Field

The present disclosure relates to Unified Modeling Language (UML), and more particularly modularizing steps within a UML user model interaction pattern by optimizing an activity diagram of the UML user model.

2. Description of Related Art

Unified Modeling Language (UML) class diagrams typically show relationships between objects within a model, and UML activity diagrams typically show the flow of logic within a model. Existing techniques for linking class diagrams to activity diagrams include linking nodes of the UML class diagram to the UML activity diagram through the use of stereotypes and subtasks.

BRIEF SUMMARY

The present disclosure is directed to a method, apparatus, and program for generating a Unified Modeling Language (UML) activity diagram of a UML task object.

According to an embodiment, there is provided a method of generating a Unified Modeling Language (UML) activity diagram of a UML task object. The method may comprise selecting a first node from a UML task diagram of the UML task object; determining whether there exists a second node of a task interaction pattern of the UML task object that matches the first node; and generating the UML activity diagram of the UML task object, the UML activity diagram including the first node, in response to determining that the second node exists.

According to another embodiment, there is provided a method generating a unified modeling language (UML) activity diagram of a UML task object. The method may comprise receiving a command to modify a node of a class diagram of the UML task object; and generating the UML activity diagram, in response to receiving the command, the generated UML activity diagram one of selectively including the node in the UML activity diagram and selectively omitting the node from the UML activity diagram, based on the command.

According to another embodiment, there is provided computer readable storage medium having embodied thereon a program which, when executed by a computer, causes the computer to execute a method of generating a unified modeling language (UML) activity diagram of a UML task object. The method may comprise receiving a command to modify a node of a class diagram of the UML task object; and generating the UML activity diagram, in response to receiving the command, the generated UML activity diagram one of selectively including the node in the UML activity diagram and selectively omitting the node from the UML activity diagram, based on the command.

According to another embodiment, there is provided an apparatus for generating a unified modeling language (UML) activity diagram of a UML task object. The apparatus may comprise a class object modification unit that receives a command to modify a node of a class diagram of the UML task object; and a class diagram modification unit that generates the UML activity diagram, in response to the command received by the class object modification unit, the generated UML activity diagram one of selectively including the node in the UML activity diagram and selectively omitting the node from the UML activity diagram, based on the command.

BRIEF DESCRIPTION OF THE SEVERAL VIEWS OF THE DRAWINGS

FIG. 8 is a diagram illustrating a system to which the embodiments of the present invention may be applied.

DETAILED DESCRIPTION

Figure 1:
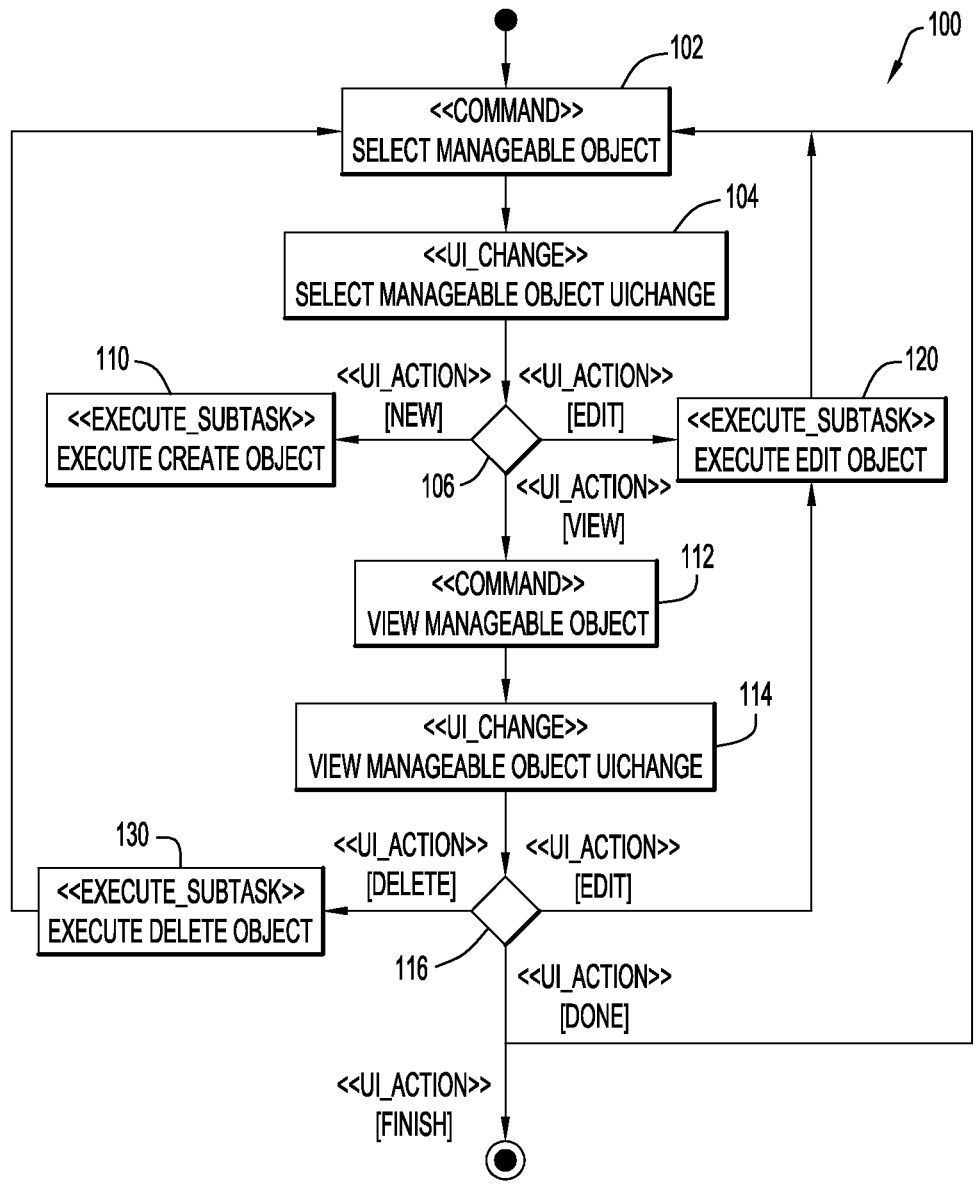
FIG. 1 illustrates a task interaction pattern.

User modeling facilitates use of a UML user model to define roles, goals, and tasks inside an organization, and defines how the roles, goals, and tasks relate to business entities within the organization. This information can be used to generate a user interface (UI) that facilitates management of the defined business entities within the organization. Each task defined inside the model, which may be represented as a stereotyped class in the UML class diagram, has a number of explicit steps associated with the task. These steps are defined in UML activity diagrams.

Conventionally, the steps associated with each task are fixed. In particular, depending on which type of task has been created, a pre-defined set of steps will be associated with that task within an activity diagram. This pre-defined set of steps is known as a task interaction pattern. The embodiments of the present invention address the use of these fixed steps to introduce a modular approach to constructing the steps within the activity diagram. As a result, greater flexibility of the steps is available in the generated UI.

Accordingly, the embodiments of the present invention relate to a mechanism whereby task interaction patterns are enhanced to include pre-defined subtask information. When generating the activity diagram, the associated task object in the class diagram may be analyzed to determine any associated subtasks. If a subtask is discovered that matches the type of subtask specified in the task interaction pattern, the nodes for this subtask will be added to the activity diagram. When no subtask is found in the class diagram to represent the subtask in the task interaction pattern, then that part of the task interaction pattern will not be included in the activity diagram. This results in the generated UI not containing the function defined in that subtask.

Consequently, this mechanism of the embodiments facilitates modularizing of the steps within the task interaction pattern. Therefore, the modeler of the class diagram may determine the steps within the task interaction pattern without directly, manually manipulating the steps of that task interaction pattern. This provides a much more flexible approach to construction of a UML user model, or any associated UML model that relies on relationships between class and activity diagrams.

As a result, a user interface may be generated from a UML user model. The tasks within the user interface are defined by objects with the <user_tasks> stereotype applied in the source UML User Model. The steps within each <user_task> are defined by generated activity diagrams, associated with the <user_task> in the model. The steps are generated from pre-defined task interaction patterns.

The mechanism of the embodiments presume that task interaction patterns include subtasks. Accordingly, it may be determined whether to include the subtasks of the task interaction pattern in the generated activity diagram. The subtask steps in the activity diagram are then only generated if there is an associated <subtask> related to the <user_task> that is represented by the activity diagram.

The present disclosure will now be described more fully with reference to the accompanying drawings, in which embodiments are shown.

FIG. 1 illustrates a task interaction pattern according to an embodiment of the present invention.

Referring to FIG. 1, the task interaction pattern 100 may be a task interaction pattern for a maintain task. The maintain task may be an operation executed on a object according to a user role. As illustrated in FIG. 1, the task interaction pattern 100 is a complete task interaction pattern for the maintain task. That is to say, the complete task interaction pattern 100 defines all the steps that are performed by the maintain task. The task interaction pattern 100 also defines the subtasks that may be performed by the maintain task. Each of the subtasks defines a set of steps that may be performed by the subtask. The subtasks 110 to 130 are represented by subtask nodes in the task interaction pattern 100. When executing the subtask associated with the subtask node 110 to 130, each step defined by the subtask is executed.

As illustrated in FIG. 1, in the task interaction pattern, a command 102 to manage an object is received. In response to receiving the command 102, a command 104 for managing a UI of the object is executed. In response to a user's selection of an item in the UI, a determination 106 is performed. If the selection is to create a new object, the create object subtask 110 is executed. If the selection is to edit an existing object, the edit object subtask 120 is executed. If the selection is to view the object, a command 112 is executed to view the object. If the object is viewed, a command 114 for viewing a UI of the object is executed. In response to the UI of the object being viewed and an item being selected by a user, a determination 116 is performed. If the selection is to delete the object, the delete object subtask 130 is executed. If the selection is to edit the object, the edit object subtask 120 is executed. If the selection is to close the UI, the maintain task ends.

Figure 2:
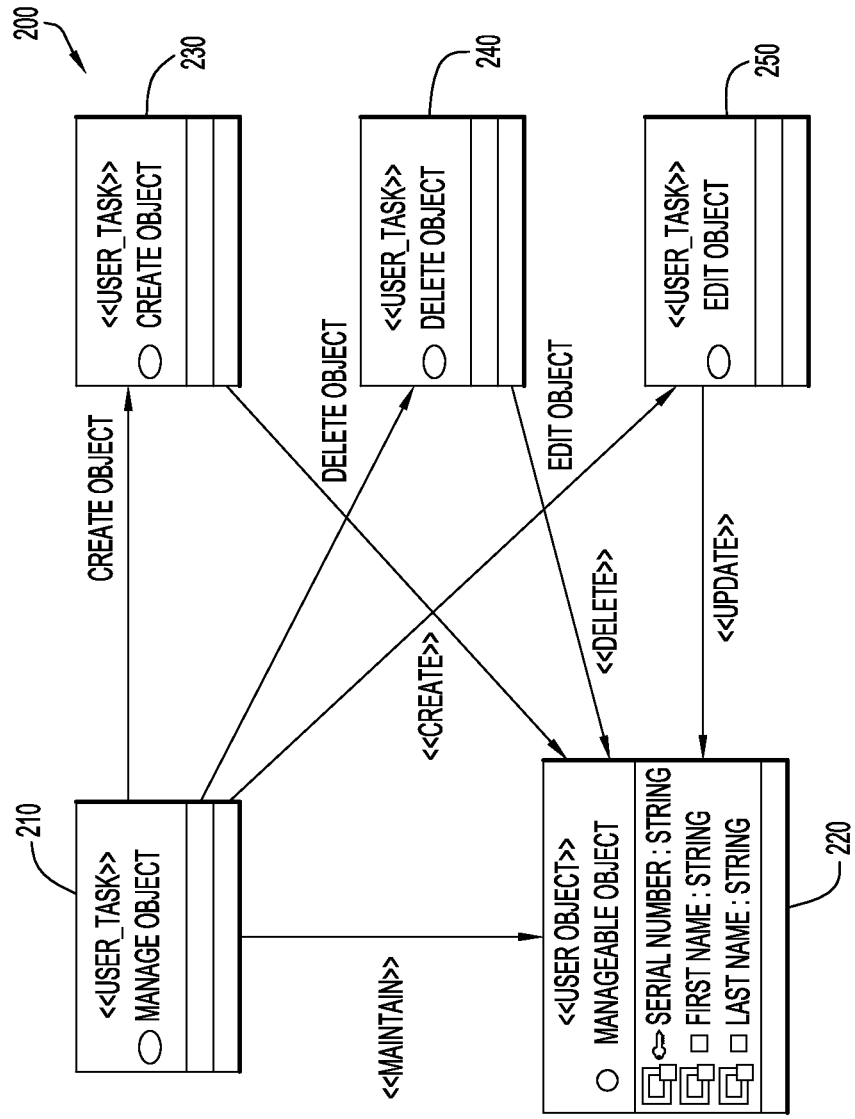
FIG. 2 illustrates a class diagram.

FIG. 2 illustrates a class diagram according to an embodiment of the present invention.

Referring to FIG. 2, the class diagram 200 may be a class diagram for a manage object task 210. The manage object task 210 may maintain a manageable object 220. Additionally, the manage object task 210 may be associated with various subtasks 230 to 250, as illustrated in FIG. 2. For example, the manage object task may be associated with a create object subtask 230, a delete object subtask 240, and an edit object subtask 250.

Conventionally, the subtask nodes 230 to 250 will always be created in the activity diagram. This is because the subtask nodes 230 to 250 are included in the task interaction pattern for the maintain task, as illustrated in FIG. 1. On the contrary, the mechanism of the embodiments of the present invention may employ the task interaction pattern of FIG. 1 and the class diagram of FIG. 2 to selectively include or exclude nodes on an activity diagram.

Whereas FIG. 2 illustrates a class diagram, a modified class diagram may be used to associate tasks with subtasks based on roles that are permitted to perform certain subtasks. For example, the class diagram may be used to associate a task with only the create subtask. Alternately, the class diagram may be used to associate a task with the create subtask and the edit subtask, but not the delete subtask. Of course, it will be readily apparent to the skilled artisan that any combination of subtasks may be associated with a task. Using the mechanism of the embodiments, the subtask nodes in task interaction pattern are selectively included in the activity diagram based on the subtasks in the class diagram, as will be discussed below regarding FIG. 3.

Figure 3:
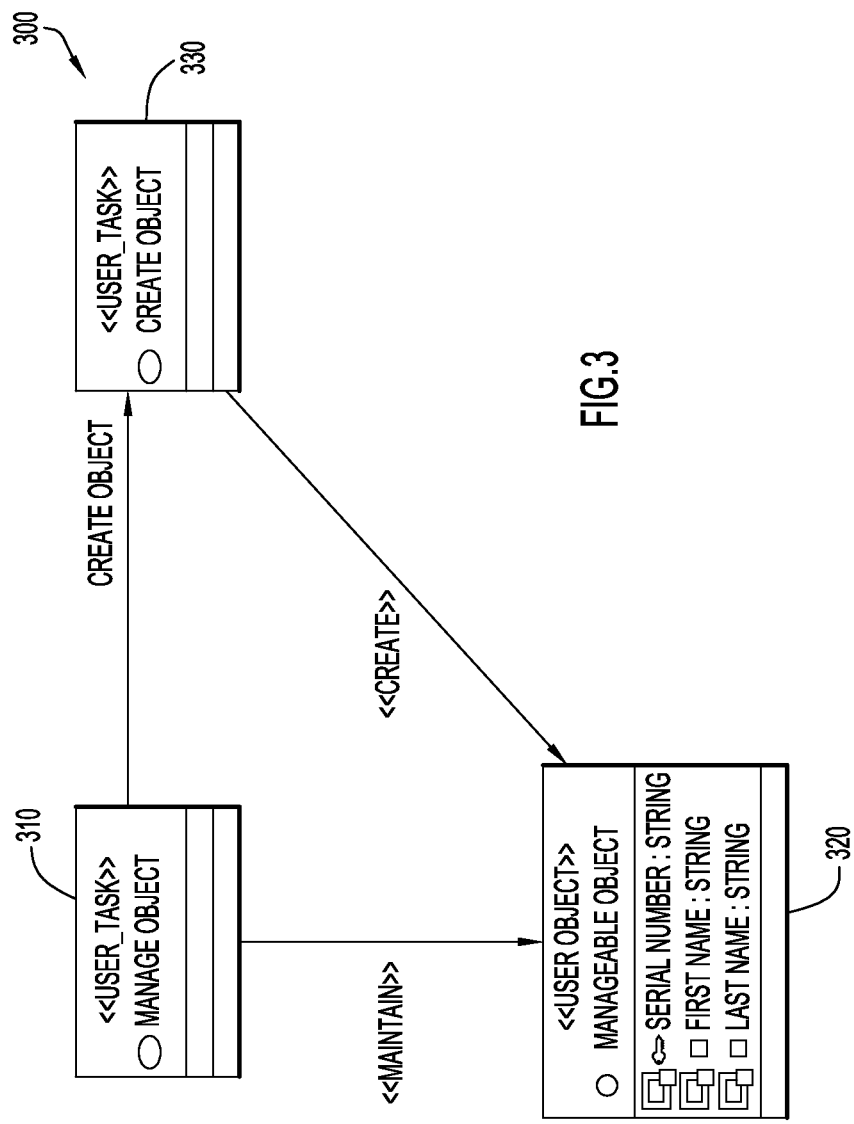
FIG. 3 illustrates a class diagram according to an embodiment of the present invention.

FIG. 3 illustrates a modified class diagram according to an embodiment of the present invention. The modified class diagram of FIG. 3 illustrates a class diagram of a manage object task that includes only one subtask, the create object subtask.

Referring to FIG. 3, the modified class diagram 300 may be a class diagram for a manage object task 310. The manage object task 310 may maintain a manageable object 320. Similar to the class diagram 200 illustrated in FIG. 2, the class diagram 300 may be associated with a create object subtask 330. However, unlike the class diagram 200, the class diagram 300 is associated with only the create object subtask 330.

According to an embodiment, the class diagram 300 may be used to generate the activity diagram. However, because the manage object task 310 has only one associated subtask (i.e., the create object subtask 330), the generated activity diagram will include only components relevant for the included subtask defined in the class diagram 300. Additionally, in the generated activity diagram, the subtask node may be included at the point in the activity diagram as defined by the interaction pattern, for example, as illustrated in FIG. 1. This introduces a modular approach to the task interaction pattern, as not all nodes from the task interaction pattern are included in the generated activity diagram. Rather, only those nodes that are defined as subtasks in the modified class diagram are included in the activity diagram.

Figure 4:
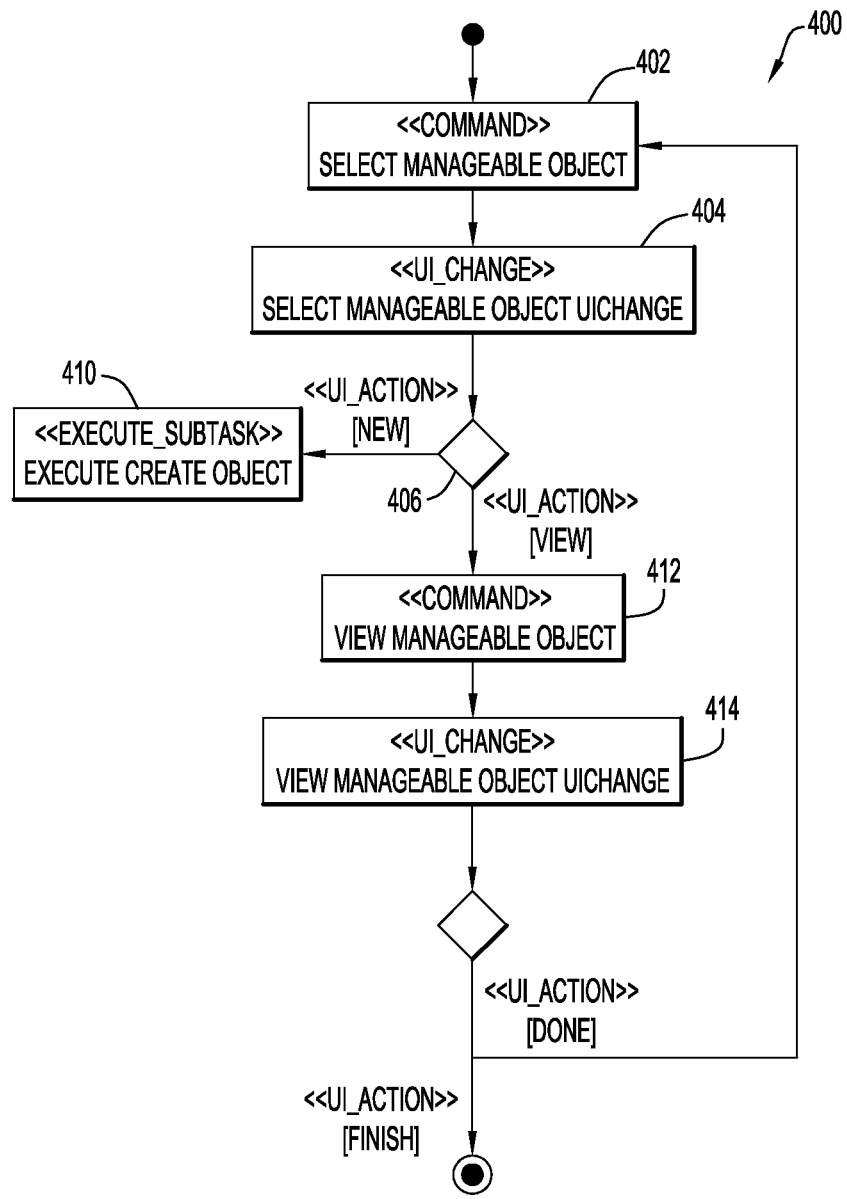
FIG. 4 illustrates an activity diagram according to an embodiment of the present invention.

FIG. 4 illustrates an activity diagram according to an embodiment of the present invention.

Referring to FIG. 4, the activity diagram 400 may be an activity diagram for a task object, for example, a manage object task. The activity diagram 400 may include a create object subtask 410. As discussed above, according to embodiments of the present invention, the activity diagram 400 may be generated from a modified class object 300, for example, as illustrated in FIG. 3 and a task interaction pattern 100, for example, as illustrated in FIG. 1. However, as illustrated in FIG. 4, while the interaction pattern may contain various subtasks (i.e., the subtask nodes 110 to 130 of the interaction pattern 100 in FIG. 1), the activity diagram 400 only contains components of those subtasks in the interaction pattern of the task object that are included in the modified class diagram 300 of the task object (i.e., the subtask nodes 310 of the class object 300 in FIG. 3).

As illustrated in FIG. 4, in the activity diagram 400, a command 402 to manage an object is received. In response to receiving the command 402, a command 404 for managing a UI of the object is executed. In response to a user's selection of an item in the UI, a determination 406 is performed. If the selection is to create a new object, the create object subtask 410 is executed. If the selection is to view the object, a command 412 is executed to view the object. If the object is viewed, a command 414 for viewing a UI of the object is executed. The task may then revert to command 402 for managing the object or complete.

Using the modular approach to the task interaction pattern discussed above provides extreme flexibility in the modeling domain. Accordingly, the number of tasks required when creating a user model is greatly reduced. As will be understood by the skilled artisan, it may be possible to have a task interaction pattern that includes many or no subtask nodes, depending on the subtasks related to the main task object in the associated class diagram. When no subtasks are included in the class diagram the activity diagram will be generated without any <<execute_subtask>> nodes. This will mean that decision point 106 in FIG. 4 will only have 1 relationship out of that node (the relationship pointing to the view node). This allows the activity diagram to make logical sense even when no<<subtasks>> are included.

Importantly, regardless of the inclusion or exclusion of the subtask nodes in the activity diagram 400, the task interaction pattern 100 is still correct and intact, and can be used to generate other activity diagrams for other roles and generate UIs for those other roles. According to the embodiments, simply adding subtasks to the associated top level task object will include extra subtask nodes into the activity diagram and change the steps within that task object, with no custom manipulation of the activity diagram itself required on behalf of the modeler. This significantly reduces the number of tasks that need to be created in the user model, and simplifies the job of the modeler by reducing the number of customizations that the modeler must make to the activity diagrams.

Figure 5:
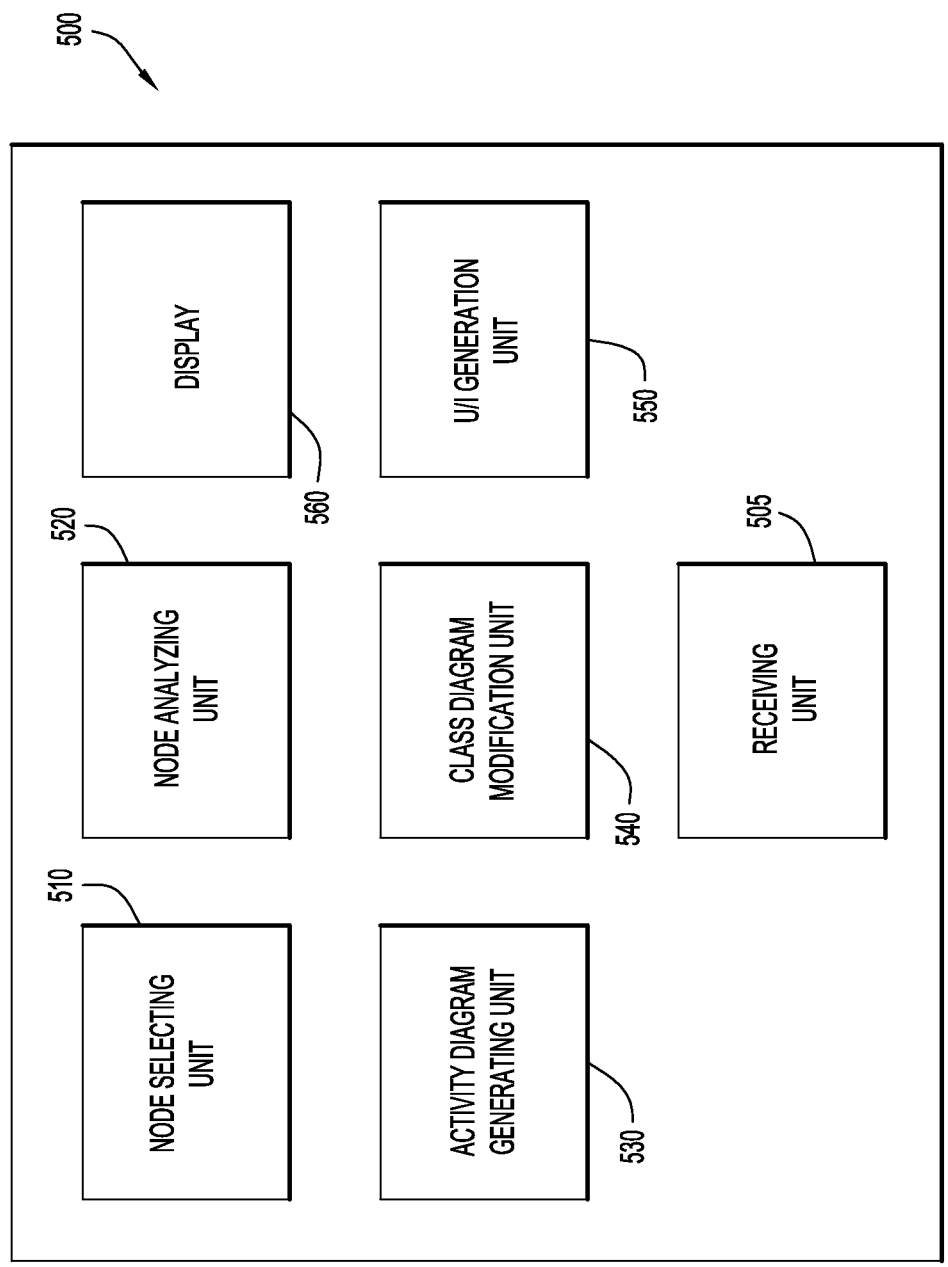
FIG. 5 is a diagram of an apparatus for generating an activity diagram of a UML task object according to an embodiment of the present invention.

FIG. 5 is a functional diagram of an apparatus for generating an activity diagram of a UML task object according to an embodiment of the present invention.

Referring to FIG. 5, the apparatus 500 may include a receiving unit 505, a node selecting unit 510, a node analyzing unit 520, and an activity diagram generating unit 530. The receiving unit 505 may receive a command to generate a UML activity diagram. In response to the command to generate a UML activity diagram of a UML task object, the node selecting unit 510 may select a node from a UML class diagram of the UML task object. The selection performed by the node selecting unit 510 may be to select a subtask node of the UML class diagram. The node selecting unit 510 may transmit a command that identifies the selected node to the node analyzing unit 520. In response to receiving the command that identifies the selected node from the node selecting unit 510, the node analyzing unit 520 determines whether there exists a node in a task interaction pattern of the UML task object that matches the selected node. The determination may determine whether there exists a subtask node in the task interaction pattern that matches the selected node, which may be a subtask node of the class object. The determination may determine whether an identifier of the subtask node of the task interaction pattern matches an identifier of the subtask node. Based on a result of determining that there exists a node in the task interaction pattern that matches the selected node of the class diagram, the node analyzing unit 520 transmits a command to the activity diagram generating unit 530 that identifies the selected node. In response to receiving the command from the node analyzing unit 520, the activity diagram generating unit 530 adds the identified node to the activity diagram of the task object.

The node selecting unit 510 may select each of the nodes from the UML class diagram of the UML task object, and transmit commands to the node analyzing unit 520 until each node of the UML class diagram is analyzed by the node analyzing unit 520. As a result, the activity diagram of the task object is generated to include those nodes in the task interaction pattern that match the nodes in the class object.

An activity diagram of the task object may have been previously generated and may exist in a memory or storage device. The apparatus may further include a class diagram modification 540 unit that receives an input to modify the class diagram. The input may be an input received from a user that instructs the class diagram modification unit 540 to add a node to the class diagram or to remove a node from the class diagram. The node to be added to the class diagram or the node to be removed from the class diagram may be a node of a task interaction pattern of the task object, as discussed above. In response to the received input, the class diagram modification unit 540 modifies the class diagram to add a node to the class diagram or to remove a node from the class diagram, based on the input. In response to the modification of the class diagram, the class diagram modification unit 540 may transmit a command, to the activity diagram generating unit 530, that indicates a node to be added to the activity diagram or a node to be removed from the activity diagram, based on the received input. In response to receiving the command from the class diagram modification unit 540, the activity diagram generating unit 530 may add a node to the activity diagram or remove a node from the activity diagram, based on the command. In this manner, the previously existing activity diagram may be updated, without generating a new activity diagram.

It will be apparent to the skilled artisan that, in response to the class diagram modification unit 540 modifying the class diagram, the class diagram modification unit may transmit a command to the node selecting unit 510 that informs the node selecting unit 510 that the class diagram is modified. The node selecting unit 510 may then select each of the nodes in the class diagram for determination by the node analyzing unit 520 to determine whether there exist matching nodes, and generate a new activity diagram, as discussed above.

The apparatus may further include a UI generation unit 550 and a display 560. The UI generation unit may generate a UI based on the activity diagram of the task object created by the activity diagram generating unit 530, and the UI may be displayed to a user on the display 560.

Figure 6:
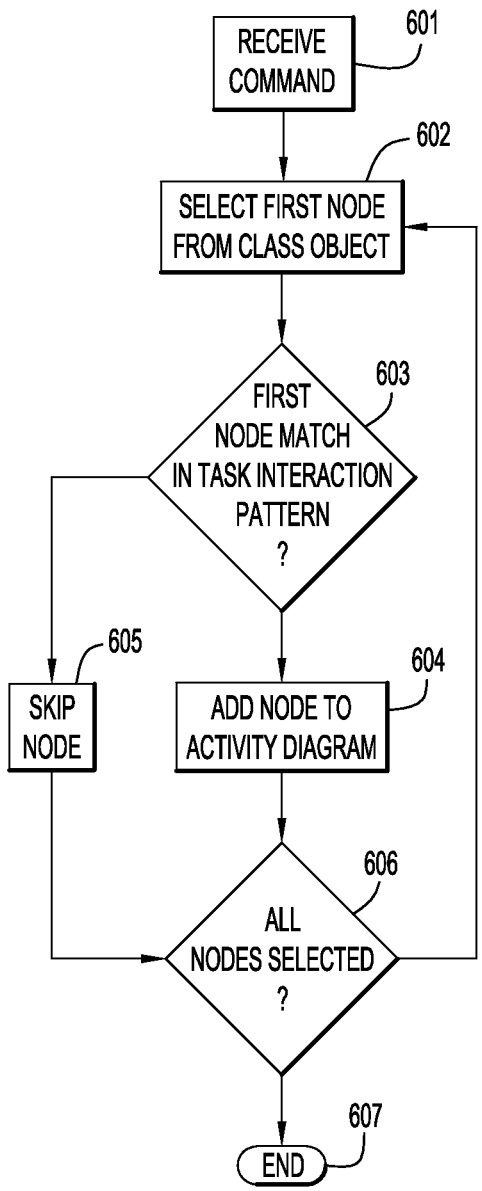
FIG. 6 is a flowchart of a method of generating a UML activity diagram according to an embodiment of the present invention.

FIG. 6 is a flowchart of a method of generating a UML activity diagram according to an embodiment of the present invention.

Referring to FIG. 6, a command is received to generate a UML activity diagram of a task object, in step 601. A first node is selected from among nodes in a modified class diagram of the task object, such as the modified class object 300 show in FIG. 3, in step 602. It is determined whether the selected node matches a node in a task interaction pattern, such as the task interaction pattern 100 shown in FIG. 1, of the task object, in step 603. If it is determined that the selected node matches a node in the task interaction pattern, the selected node is added to the activity diagram, such as the activity diagram 400 shown in FIG. 4, in step 604. If it is determined that the selected node does not match a node in the task interaction pattern, the selected node is not added to the activity diagram, in step 605. It is determined whether all nodes of the class diagram have been selected, in step 606. If all nodes of the class diagram have been selected, the process ends, in step 607. If all the nodes of the class diagram have not been selected, the process returns to step 602 and a next node of the class diagram is selected.

Figure 7:
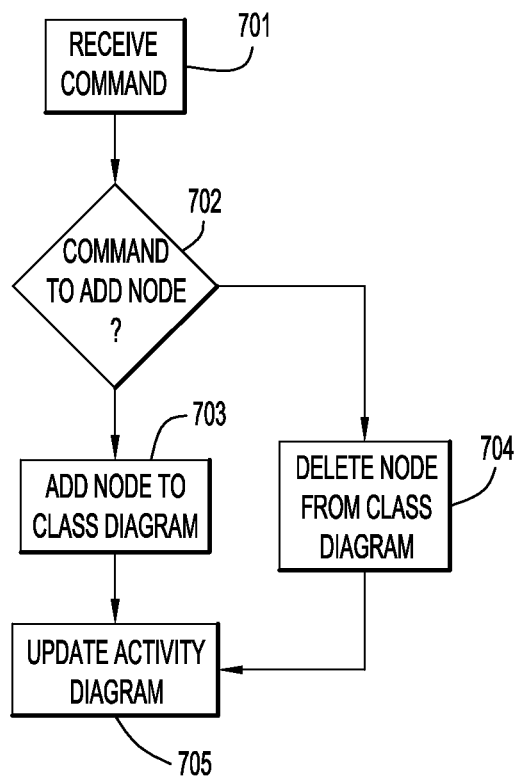
FIG. 7 is a flowchart of a method of updating a UML activity diagram according to an embodiment of the present invention.

FIG. 7 is a flowchart of a method of updating a UML activity diagram according to an embodiment of the present invention.

Referring to FIG. 7, a command is received to modify a class object of a UML task object, in step 701. It is determined whether the command is a command to add a node to the existing UML class diagram or a command to delete a node from the class diagram, in step 702. If it is determined that the command is to add a node to the class diagram, the node is added to the class diagram, in step 703. If it is determined that the command is to delete a node from the class diagram, the node is deleted from the class diagram, in step 704. The UML activity diagram is updated, in step 705, to add a node, which corresponds to the node added to the class diagram in step 703, to the UML activity diagram, or to omit a node, which corresponds to the node deleted from the class diagram in step 704, from the UML activity diagram, in step 705.

As will be apparent to the skilled artisan, the command received in step 701 may be a command to include one or more nodes in the class object, a command to delete one or more nodes in the class object, or a combination of adding to and removing from the class object one or more nodes. As will also be apparent to the skilled artisan, the updating of the activity diagram may be performed after each of the nodes is added to or deleted from the class diagram, or alternatively, the updating of the activity diagram may be cumulatively performed after all the nodes are added to or deleted from the class diagram.

As will be appreciated by one skilled in the art, the embodiments of the present invention discussed above may take the form of an entirely hardware embodiment, an entirely software embodiment (including firmware, resident software, micro-code, etc.) or an embodiment combining software and hardware aspects that may all generally be referred to herein as a "circuit," "module" or "system," for example, such as the receiving unit 505, node selecting unit 510, node analyzing unit 520, activity diagram generating unit 530, class diagram modification unit 540, and UI generation unit 550. Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the present invention are described above and below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 8 is a diagram illustrating a system to which the embodiments of the present invention may be applied.

Referring to FIG. 8, the system 800 may be a general purpose computer, special purpose computer, personal computer, server, or the like. The system 800 may include a processor 810, a memory 820, a storage unit 830, an I/O interface 840, a user interface 850, and a bus 860. The processor 810 may be a central processing unit (CPU) that controls the operation of the system 800 by transmitting control signals and/or data over the bus 860 that communicably connects the elements 810 to 850 of the system 800 together. The bus 860 may be a control bus, a data bus, or the like. The processor 810 may be provided with instructions for implementing and controlling the operations of the system 800, for example, in the form of computer readable codes. The computer readable codes may be stored in the memory 820 or the storage unit 830. Alternatively, the computer readable codes may be received through the I/O interface 840 or the user interface 850. As discussed above, the memory 820 may include a RAM, a ROM, an EPROM, or Flash memory, or the like. As also discussed above, the storage unit 830 may include a hard disk drive (HDD), solid state drive, or the like. The storage unit 830 may store an operating system (OS) and application programs to be loaded into the memory 820 for execution by the processor 810. The I/O interface 840 performs data exchange between the system and other external devices, such as other systems or peripheral devices, directly or over a network, for example a LAN, WAN, or the Internet. The I/O interface 840 may include a universal serial bus (USB) port, a network interface card (NIC), Institution of Electronics and Electrical Engineers (IEEE) 1394 port, and the like. The user interface 850 receives input of a user and providing output to the user. The user interface 850 may include a mouse, keyboard, touchscreen, or other input device for receiving the user's input. The user interface 850 may also include a display, such as a monitor or liquid crystal display (LCD), speakers, and the like for providing output to the user.

Although a few embodiments have been shown and described, it will be appreciated by those skilled in the art that changes may be made in these embodiments without departing from the principles and spirit of the inventive concept, the scope of which is defined in the appended claims and their equivalents.

The invention claimed is:

1. A method of generating a unified modeling language (UML) activity diagram of a UML task object, the method comprising:
   receiving a command to modify a node of a class diagram of the UML task object; and
   generating the UML activity diagram, in response to receiving the command, the generated UML activity diagram including the node in the UML activity diagram or omitting the node from the UML activity diagram, based on whether the node of the class diagram of the UML task object matches a node of a task interaction pattern of the UML task object, wherein the task interaction pattern of the UML task object comprises a set of all steps of the UML task object.

2. The method according to claim 1, wherein the set of all steps includes a plurality of subtasks, wherein the node of the class diagram of the UML task object is a subtask node of the class diagram, and generating the UML activity diagram further comprises:
   including the subtask node of the class diagram in the UML activity diagram when the subtask node of the class diagram matches a subtask node of the task interaction pattern; and
   omitting the subtask node of the class diagram from the UML activity diagram when the subtask node of the class diagram does not match a subtask node of the task interaction pattern.

3. The method according to claim 1, wherein the command to modify the class diagram indicates to add a first node to the class diagram or to remove a second node from the class diagram.

4. The method according to claim 3, wherein the command indicates to add the first node to the class diagram, and
   wherein the generating comprises including the first node in the generated UML activity diagram.

5. The method according to claim 4, wherein the first node of the class diagram of the UML task object is a subtask node of the class diagram.

6. The method according to claim 3, wherein the command indicates to remove the second node from the class diagram, and
   wherein the generating comprises omitting the second node from the class diagram.

7. The method according to claim 6, wherein the second node of the class diagram of the UML task object is a subtask node of the class diagram.

8. A non-transitory computer readable storage medium having embodied thereon a program which, when executed by a computer, causes the computer to execute a method of generating a unified modeling language (UML) activity diagram of a UML task object, the method comprising:
   receiving a command to modify a node of a class diagram of the UML task object; and
   generating the UML activity diagram, in response to receiving the command, the generated UML activity diagram including the node in the UML activity diagram or omitting the node from the UML activity diagram, based on whether the node of the class diagram of the UML task object matches a node of a task interaction pattern of the UML task object, wherein the task interaction pattern of the UML task object comprises a set of all steps of the UML task object.

9. The non-transitory computer readable storage medium according to claim 8, wherein the set of all steps includes a plurality of subtasks, wherein the node of the class diagram of the UML task object is a subtask node of the class diagram, and generating the UML activity diagram further comprises:
   including the subtask node of the class diagram in the UML activity diagram when the subtask node of the class diagram matches a subtask node of the task interaction pattern; and
   omitting the subtask node of the class diagram from the UML activity diagram when the subtask node of the class diagram does not match a subtask node of the task interaction pattern.

10. The non-transitory computer readable storage medium according to claim 8, wherein the command to modify the class diagram indicates to add a first node to the class diagram or to remove a second node from the class diagram.

11. The non-transitory computer readable storage medium according to claim 10, wherein the command indicates to add the first node to the class diagram, and
   wherein the generating comprises including the first node in the generated UML activity diagram.

12. The non-transitory computer readable storage medium according to claim 11, wherein the first node of the class diagram of the UML task object is a subtask node of the class diagram.

13. The non-transitory computer readable storage medium according to claim 10, wherein the command indicates to remove the second node from the class diagram, and
   wherein the generating comprises omitting the second node from the class diagram.

14. The non-transitory computer readable storage medium according to claim 13, wherein the second node of the class diagram of the UML task object is a subtask node of the class diagram.

15. An apparatus comprising a processor to perform a method for generating a unified modeling language (UML) activity diagram of a UML task object, the method comprising:
   receiving a command to modify a node of a class diagram of the UML task object; and
   generating the UML activity diagram, in response to the command, the generated UML activity diagram including the node in the UML activity diagram or omitting the node from the UML activity diagram, based on whether the node of the class diagram of the UML task object matches a node of a task interaction pattern of the UML task object, wherein the task interaction pattern of the UML task object comprises a set of all steps of the UML task object.

16. The apparatus according to claim 15, wherein the set of all steps includes a plurality of subtasks, wherein the node of the class diagram of the UML task object is a subtask node of the class diagram, and generating the UML activity diagram further comprises:
   including the subtask node of the class diagram in the UML activity diagram when the subtask node of the class diagram matches a subtask node of the task interaction pattern; and
   omitting the subtask node of the class diagram from the UML activity diagram when the subtask node of the class diagram does not match a subtask node of the task interaction pattern.

17. The apparatus according to claim 15, wherein the command to modify the class diagram indicates to add a first node to the class diagram or to remove a second node from the class diagram.

18. The apparatus according to claim 17, wherein the command indicates to add the first node to the class diagram, and
   wherein the generating comprises including the first node in the generated UML activity diagram.

19. The apparatus according to claim 18, wherein the first node of the class diagram of the UML task object is a subtask node of the class diagram.

20. The apparatus according to claim 17, wherein the command indicates to remove the second node from the class diagram, and
   wherein the generating comprises omitting the second node from the class diagram.

21. The apparatus according to claim 20, wherein the second node of the class diagram of the UML task object is a subtask node of the class diagram.

* * * * *